United States Patent [19]

Ando et al.

[11] Patent Number: 5,623,671
[45] Date of Patent: Apr. 22, 1997

[54] MUTUAL EXCLUSION CONTROL APPARATUS FOR MUTUAL EXCLUSION CONTROL BASED ON LOCKING AND UNLOCKING REQUESTS

[75] Inventors: Kiyoshi Ando; Toyotugu Kasahara; Jyunichi Kawakubo, all of Tokyo, Japan

[73] Assignee: NEC Corporation, Tokyo, Japan

[21] Appl. No.: 403,107

[22] Filed: Mar. 13, 1995

[30] Foreign Application Priority Data

Mar. 16, 1994 [JP] Japan .................................. 6-045823

[51] Int. Cl.⁶ .......................... G06F 12/14; G06F 13/00
[52] U.S. Cl. .......................... 395/726; 395/479; 395/490; 364/DIG. 1; 364/DIG. 2; 364/246.8
[58] Field of Search .................... 395/478, 479, 395/490, 491, 492, 726, 727; 364/DIG. 1, DIG. 2, 246.8

[56] References Cited

U.S. PATENT DOCUMENTS

| | | | |
|---|---|---|---|
| 4,890,222 | 12/1989 | Kirk | 395/550 |
| 4,984,153 | 1/1991 | Kregnen et al. | 395/490 |
| 5,130,710 | 7/1992 | Salazar | 341/11 |
| 5,142,676 | 8/1992 | Fried et al. | 395/490 |
| 5,175,837 | 12/1992 | Arnold et al. | 395/490 |
| 5,237,694 | 8/1993 | Horne et al. | 395/490 |
| 5,249,285 | 9/1993 | Mueller et al. | 395/490 |
| 5,263,146 | 11/1993 | Mishima | 395/490 |
| 5,276,847 | 1/1994 | Kohn | 395/490 |
| 5,321,825 | 6/1994 | Song | 395/490 |
| 5,339,397 | 8/1994 | Eikill et al. | 395/490 |
| 5,341,491 | 8/1994 | Ramanujan | 395/490 |
| 5,430,860 | 7/1995 | Capps, Jr. et al. | 395/490 |
| 5,442,755 | 8/1995 | Shibata | 395/550 |

*Primary Examiner*—Tod R. Swann
*Assistant Examiner*—Tuan V. Thai
*Attorney, Agent, or Firm*—Foley & Lardner

[57] ABSTRACT

A mutual exclusion control is performed with dynamically, allocated lock variables. A lock request circuit issues a lock acquisition request or an unlock request. A lock identifying information holding circuit holds an identifying information related to a currently valid lock. A lock identifying information comparing circuit judges whether or not a lock identifying information from the lock request circuit is included in the lock identifying information holding circuit. A lock identifying information updating circuit updates the lock identifying information holding circuit on the basis of the request from the lock request circuit.

3 Claims, 5 Drawing Sheets

MUTUAL EXCLUSION CONTROL APPARATUS FOR MUTUAL EXCLUSION CONTROL BASED ON LOCKING AND UNLOCKING REQUESTS

BACKGROUND OF THE INVENTION

The present invention relates to a mutual exclusion control apparatus for controlling mutual exclusion between a plurality of processors.

The term "mutual exclusion control" means a control for memory access such that only one of a plurality of processors can access at one time to a resource such as a memory region which is shared by the processors. For example, in a case where the respective processors update a shared variable, a certain one of the processors must exclusively perform a processing including "reading" the shared variable from memory, "modifying" it and "rewriting" the modified shared variable to memory. When another processor accesses the shared variable during this processing of the one processor, the access can not be guaranteed as normal. In order to avoid such situation, it is usual to provide a lock variable correspondingly to each shared variable or shared variable region. The lock variable is locked when one processor accesses to the shared variable and unlocked when the access is terminated. Therefore, the access is guaranteed as normal with the mutual exclusion control such that a processor checks the lock variable when it intends to access the corresponding shared variable and accesses it only when the lock variable is in unlocked state.

In the prior art, the lock variables are allocated in a shared memory. The shared memory includes a memory portion for storing the value of lock variables to indicate whether a processor is or is not currently in a critical section. The lock variables may have either an available value indicating that no processor is in a critical section or busy value indicating that processor is in a critical section.

For example, U.S. Pat. No. 5,237,694, issued Aug. 17, 1993 discloses a system and method for use in a processing system of the type including a plurality of processor subsystems, each processor subsystem including a processor, and being coupled together and to a shared memory by a common bus. The lock variables are allocated in the shared memory and cached in a lock buffer. The lock buffer can be servicing lock variable accesses from the common bus while the processor's data cache is serving non-lock variable accesses from the processor. The lock buffer works as a cache memory for lock variables, however, the shared memory allocates the lock variables statically.

In the prior art mentioned above, the lock variables are allocated on the lock table in the shared memory statically. Therefore, if the number of the critical section is increased, the number of lock variables is increased correspondingly. Since the number of the processors which require mutual exclusion control at the same time period for practical programs is limited, it is not always necessary to statically allocate all of the lock variables.

Further, there is another problem that, when there is a failure in a processor which locks the lock variable, it is not easy to unlock the lock variable.

SUMMARY OF THE INVENTION

An object of the present invention is to prevent a region necessary for variable locking from being relatively increased even if the number of the critical section is increased.

Another object of the present invention is to unlock the lock variable locked by a processor which has a failure.

In order to achieve the above objects, a mutual exclusion control apparatus according to the present invention in one preferred mode, comprises lock information manage means for dynamically allocating a lock variable which holds a lock identifying information for a region to be accessed exclusively.

DETAILED DESCRIPTION OF THE PREFERRED EMBODIMENTS

A first embodiment of mutual exclusion control apparatus of the present invention will be described with respect to FIGS. 1 to 4.

Figure 1:
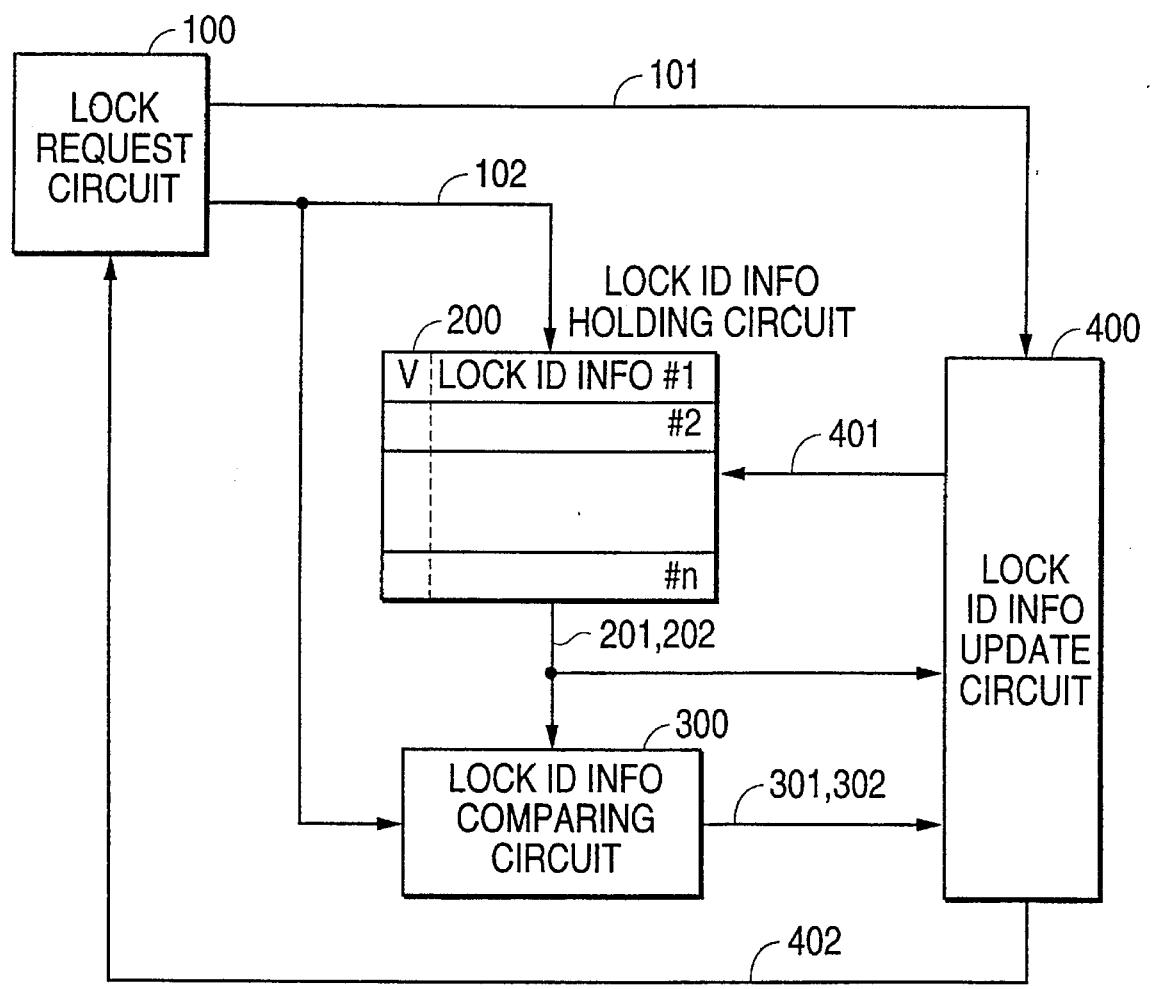
FIG. 1 is a block diagram showing a configuration of a first embodiment of mutual exclusion control apparatus according to the present invention.

Referring to FIG. 1, mutual exclusion control apparatus according to the first embodiment of the present invention comprises a lock request circuit 100 for issuing a lock acquisition request or unlock request, a lock identifying information holding circuit 200 for holding a lock identifying information with respect to currently effective locks, a lock identifying information comparing circuit 300 for determining whether or not the lock identifying information from the lock request circuit 100 is included in the lock identifying information holding circuit 200, and a lock identifying information updating circuit 400 for updating the lock identifying information holding circuit 200 on the basis of the request from the lock request circuit 100.

The lock request circuit 100 issues a lock request, that is, the lock acquisition request or the unlock request, on a lock request signal line 101 and a lock identifying information of the lock request on a lock identifying information signal line 102. The term "lock identifying information" means an information for identifying a region to be locked, that is, shared region, and includes a number assigned to the region to be locked or an address of the region to be locked, etc. In the first embodiment, an absolute address for the region to be locked is used as the lock identifying information.

The lock identifying information holding circuit 200 has n entries each including the "lock identifying information" and a "validness of lock identifying information" indicating whether or not the lock identifying information is currently valid. The "validness of lock identifying information" is shown as "v" in FIG. 1. The shared region corresponding to the lock identifying information registered as valid in the lock identifying information holding circuit 200 is currently in a locked state. That is, the lock identifying information of an entry whose "validness of lock identifying information" indicates "valid" means that the shared region is currently locked.

The lock identifying information comparing circuit 300 judges whether or not the lock identifying information corresponding to the lock acquisition request or the unlock request from the lock request circuit 100 is one registered in the lock identifying information holding circuit 200 as a valid information.

The lock identifying information updating circuit 400 updates the lock identifying information holding circuit 200 on the basis of the lock acquisition request or the unlock request from the lock request circuit 100. If the request from the lock request circuit 100 is a lock acquisition request and corresponding lock identifying information is not registered in the lock identifying information holding circuit 200, the lock identifying information updating circuit 400 acquires a new entry to register the lock identifying information in the lock identifying information holding circuit 200. It cannot update the lock identifying information holding circuit 200 if the same lock identifying information is registered already or there is no new entry to be obtained. An information of whether or not the lock acquisition is possible is returned to the lock request circuit 100. When the request from the lock request circuit 100 is an unlock request, an entry containing a corresponding lock identifying information is invalidated.

Figure 2:
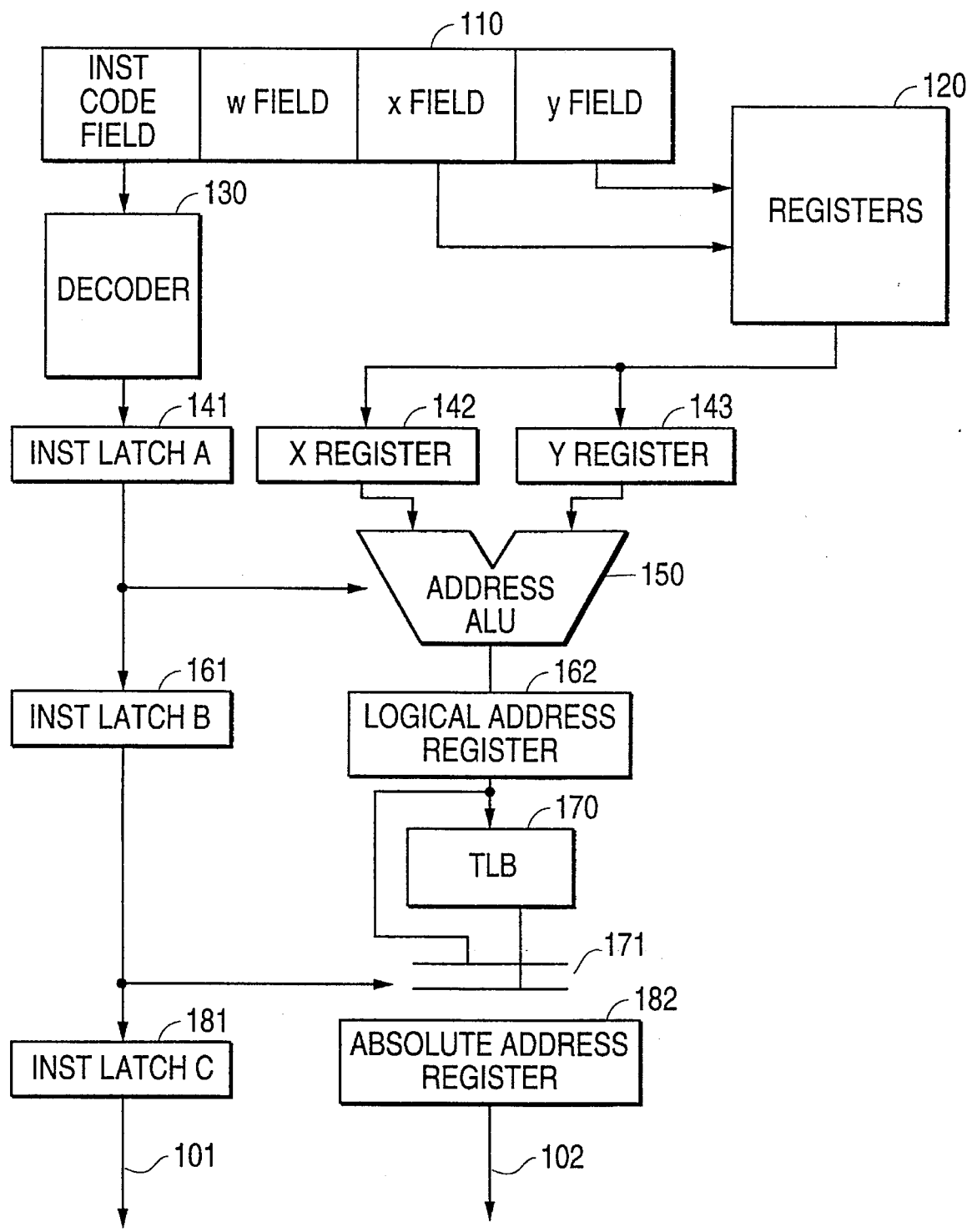
FIG. 2 is a block diagram showing an example of a construction of a lock request circuit of the first embodiment of the mutual exclusion control apparatus according to the present invention.

Referring to FIG. 2, the lock request circuit 100 includes an instruction register 110 for storing instructions to be executed, a group of registers 120 for storing data temporarily, a decoder 130 for decoding instructions, instruction latches A-C (141,161, 181) for holding instructions in respective stages, an address ALU (arithmetic and logical unit) 150, an X register 142 and a Y register 143 which hold input operands of the address ALU 150, a logical address register 162 for holding a result of operation in the address ALU 150, a TLB (Translation Look-aside Buffer) 170 for address translation; and an absolute address register 182 for holding absolute addresses.

Among instructions held in the instruction register 110, it is assumed that there are two lock instructions, a lock acquisition request instruction and an unlock request instruction. These lock instructions are further classified into instructions which use the logical address as lock identifying information and instructions which use the absolute address as lock identifying information. In a case where the lock instruction is based on the logical address, a content of the X register assigned by x field and a content of the Y register assigned by y field are added to obtain a logical address which, after being translated into an absolute address by indexing the TLB 170, is used as the lock identifying information. In a case where the lock instruction is based on the absolute address, a content of the X register assigned by x field and a content of the Y register assigned by y field are added to obtain an absolute address which is used as the lock identifying information.

An instruction code field of the instruction register 110 is decoded by the decoder 130 and then held in the instruction latches A-C (141, 161, 181) sequentially. A content of the instruction latch C (181) is output to the lock request signal line 101. The x field and y field of the instruction register 110 indicate register numbers corresponding to the respective registers 120. The register 120 specified by the register numbers of the x and y fields is read out or written in. The read data are held in the X register 142 and the Y register 143.

The address ALU 150 adds the values of the X and Y registers 142 and 143 to produce a logical address and stores the result in a logical address register 162.

The TLB 170 is to realize an address translating function by associative memory and translates the logical address into the absolute address. A selector 171 selects one of the output of the TLB 170 and the value held in the logical address register 162 according to a content of the instruction latch B (161) and holds it in an absolute address register 182. The absolute address held in the absolute address register 182 is output to the lock identifying information signal line 102.

Figure 3:
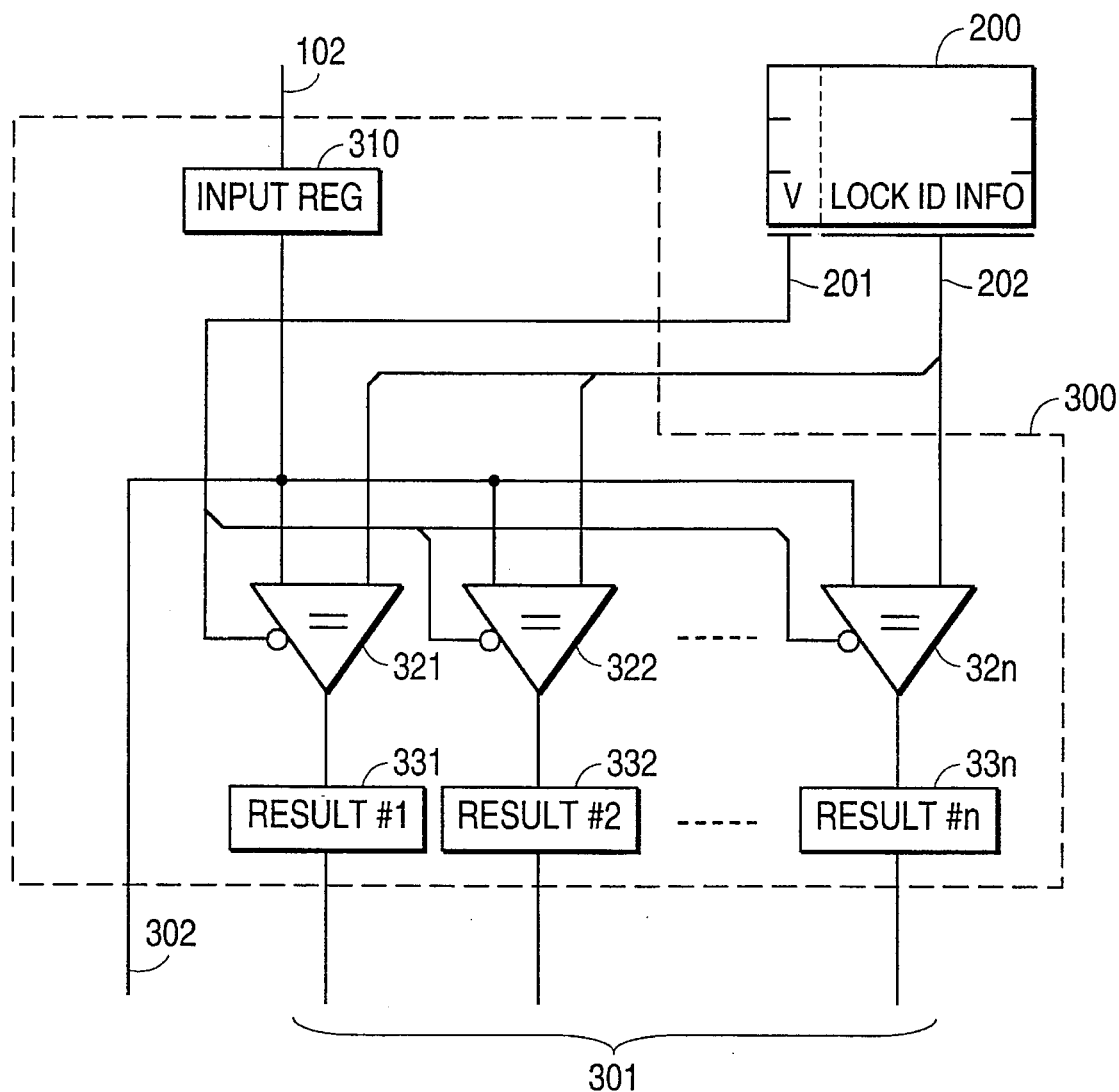
FIG. 3 is a block diagram showing an example of a construction of a lock identifying information comparing circuit of the first embodiment of the mutual exclusion control apparatus according to the present invention.

Referring to FIG. 3, the lock identifying information comparing circuit 300 includes an input register 310 for holding the lock identifying information from the lock identifying information signal line 102, comparators 321–32n for comparing the lock identifying information of the input register 310 with lock identifying information of the respective entries of the lock identifying information holding circuit 200; and registers 331–33n for holding results of comparisons in the respective comparators 321–32n. The comparators 321–32n correspond to the respective entries of the lock identifying information holding circuit 200 and compare the lock identifying information of the respective entries with the lock identifying information of the input register 310 to find any coincidence. In this comparing operation, the validness of the respective entries of the lock identifying information holding circuit 200 are input to the comparators 321–32n through the signal line 20. That is, the entry or entries whose validness indicate "invalid" are excluded from comparison.

The result of comparison thus obtained from the comparators 331–33n is sent to the lock identifying information updating circuit 400 through a signal line 301. Further, the lock identifying information of the input register 310 is supplied through a signal line 302 to the lock identifying information updating circuit 400 and held in an input register 410 (not shown) thereof.

When the lock request from the lock request circuit 100 is a lock acquisition request, the lock identifying information updating circuit 400 acquires a new entry in the lock identifying information holding circuit 200 by the lock identifying information of the input register 410 according to the result of comparison from the lock identifying information comparing circuit 300. On the other hand, when the lock request from the lock request circuit 100 is an unlock request, the lock identifying information updating circuit 400 invalidates a corresponding entry. This invalidation can be realized by making the validation of the entry "invalid". The update of the lock identifying information holding circuit 200 is performed through a signal line 401. When a lock is acquired, the validness of the respective entries of the lock identifying information holding circuit 200 are referenced through the signal line 201. If there is no available entry, it is impossible to acquire a new entry, that is, it is impossible to newly set a lock identifying information. Therefore, in this case, a notice that it is impossible to acquire a lock is sent to the lock request circuit 100 through the signal line 402. Similarly, when a lock is acquired, a notice that a lock is acquired is sent to the lock request circuit 100 through the signal line 402.

Now, an operation of the first embodiment as mentioned above will be described.

Figure 4:
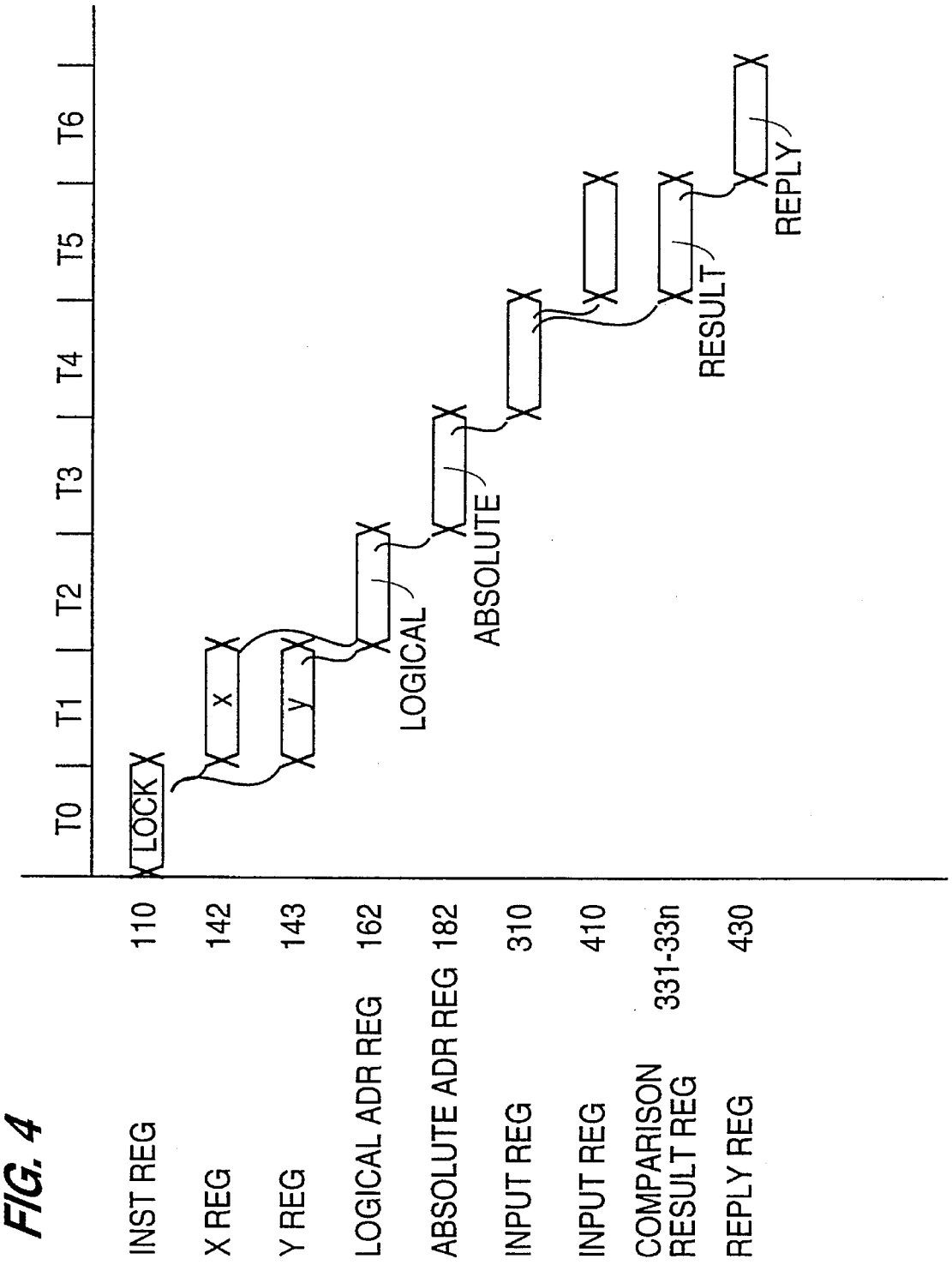
FIG. 4 is a timing chart showing an operation of the first embodiment of the mutual exclusion control apparatus according to the present invention.

Referring to FIG. 4, at a time instance T=T0, a lock acquisition instruction has been held in the instruction register 110. At a time instance T=T1, the data are read out from the registers 120 and held in the X register 142 and the Y register 143. At a time instance T=T2, the result of address operation by the address ALU 150 is held in the logical address register 162. At a time instance T=T3, the result of address translation by the TLB 170 is held in the absolute address register 182 even if the instruction of the instruction latch B 161 is a lock instruction based on logical address.

At a time instance T=T4, the above mentioned absolute address is held in the input register 310. At a time instance T=T5, the absolute address held in the input register 310 is compared as the lock identifying information with lock identifying information of the respective entries of the lock identifying information holding circuit 200. The result of comparisons is held in the registers 331–33n at the time instance T=T5. At the same time instance, the absolute address in the input register 310 of the lock identifying information comparing circuit 300 is held in the input register 410 of the lock identifying information updating circuit 400. At a time instance T=T6, the result of comparisons of the registers 331–33n is totally held in a reply register 430 (not shown) of the lock identifying information updating circuit 400 and an existence or absence of lock acquisition is returned to the lock request circuit 100 through the signal line 402.

As described, according to the first embodiment of the present invention in which a lock identifying information is held in the lock identifying information holding circuit when required, unlike the prior art in which all lock variables are statically held, mutual exclusion controls corresponding in number to entries of the lock identifying information holding circuit can be done simultaneously at the maximum.

A second embodiment of the mutual exclusion control apparatus according to the present invention will be described in detail with reference to FIG. 5.

Figure 5:
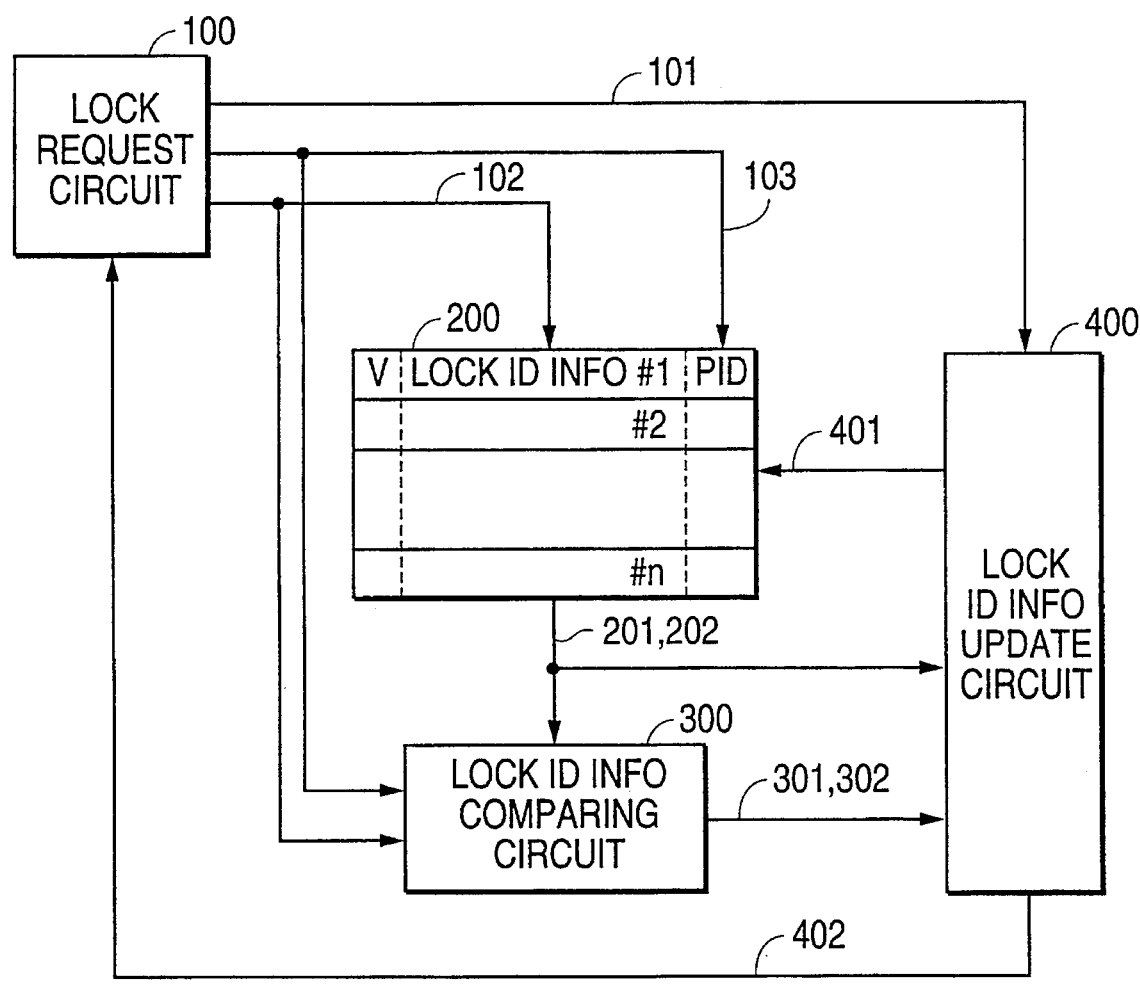
FIG. 5 is a block diagram showing a configuration of a second embodiment of the mutual exclusion control apparatus according to the present invention.

Referring to FIG. 5, the mutual exclusion control apparatus according to the second embodiment of the present invention has a similar configuration to that of the first embodiment except that it includes processor identifiers (PIDs) of respective entries of a lock identifying information circuit 200. The PID is an identifier assigned to each processor. The identifier of a processor which locks a shared region is held in the PID field. The PID is supplied from a lock request circuit 100 to the lock identifying information holding circuit 200 and a lock, identifying information comparing circuit 300 through a lock requesting processor ID signal line 103.

In the second embodiment, an unlock instruction instructs an unlocking by the processor ID. In this case, a value stored in a location assigned by x field of an X register is used as the PID, in addition to the first embodiment.

In the lock identifying information comparing circuit 300, a PID given by a lock request circuit 100 is compared with the PID of the lock identifying information holding circuit 200, in addition to the first embodiment. A basic configuration for performing the above-mentioned comparison is similar to that of the comparators of the first embodiment shown in FIG. 3.

Responding to the unlock instruction with the PID, a lock identifying information updating circuit 400 invalidates all of entries of the lock identifying information holding circuit 200 which indicate coincidence.

As described, according to the second embodiment of the present invention, it is possible to easily perform an unlocking even when a processor which acquired a lock becomes unable to unlock for some reason.

In summary, according to the present invention in which a lock identifying information is acquired in the lock identifying information holding circuit when required, unlike the prior art in which all lock variables are statically held. Therefore, mutual exclusion controls corresponding in number to entries of the lock identifying information holding circuit at most can be done at the same time period.

Further, according to the present invention, it is possible to specify a lock identifying information strictly by using the absolute address of shared variable as a lock identifying information.

In addition, it is possible to unlock easily even when a processor which acquired a lock becomes unable to unlock for some reason.

What is claimed is:

1. A mutual exclusion control apparatus for a mutual exclusion control upon receipt of a locking acquisition request or an unlocking request from lock request means, comprising:

lock identifying information holding means having at least one entry for holding a lock identifying information for identifying a region indicated by said lock request means as a target of mutual exclusion control;

lock identifying information comparing means for judging whether or not the lock identifying information from said lock request means is included in said lock identifying information holding means; and lock identifying information updating means for updating said lock identifying information holding means based on a request from said lock request means, wherein said lock identifying information holding means holds in each entry thereof a processor number related to a processor which has set the lock identifying information of the entry, said lock identifying information comparing means judges whether or not a processor number related to an unlock request from said lock request means is included in the respective entries of said lock identifying information holding means, said lock identifying information updating means invalidates any entry for which a coincidence of processor number is detected in said lock identifying information comparing means, wherein all entries of said lock identifying information holding means determined by said lock identifying information comparing means as including a processor number matching the unlock request are invalidated even if the corresponding processor is unable to unlock, and wherein said lock request means includes:
an instruction register for storing instructions to be executed;
a plurality of registers for temporarily storing data;
a decoder for decoding the instructions stored in said instruction register;
a plurality of instruction latches for holding said instructions in respective stages;
an address arithmetic logic unit for performing arithmetic operations on input operands and for outputting an arithmetic result of the input operands;
a plurality of operand registers for holding the input operands of the address arithmetic logic unit;
a logic address register for holding the arithmetic result of the address arithmetic logic unit;
a translation lookaside buffer for performing address translation; and an absolute address register for holding absolute addresses.

2. The mutual exclusion control apparatus claimed in claim 1, wherein the region identified by the lock identifying information includes an identification number.

3. The mutual exclusion control apparatus claimed in claim 1, wherein said lock identifying comparing means further comprises:

an input register for holding the lock identifying information from said lock request means;

a plurality of comparators for comparing the lock identifying information held in said input register with lock identifying information of said at least one entry of said lock identifying information holding means; and a plurality of output registers for holding results of the comparisons performed by said plurality of comparators.

* * * * *